US006954423B2

(12) United States Patent
Tinker

(10) Patent No.: US 6,954,423 B2
(45) Date of Patent: Oct. 11, 2005

(54) ANALOG IMPLEMENTATION OF LINEAR TRANSFORMS

(76) Inventor: Frank A. Tinker, 6740 N. Leonardo Da Vinci Way, Tucson, AZ (US) 85740

( * ) Notice: Subject to any disclaimer, the term of this patent is extended or adjusted under 35 U.S.C. 154(b) by 50 days.

(21) Appl. No.: 10/348,236

(22) Filed: Jan. 21, 2003

(65) Prior Publication Data

US 2004/0141459 A1 Jul. 22, 2004

(51) Int. Cl.[7] .............................................. H04J 11/00
(52) U.S. Cl. ...................................... 370/208; 370/210
(58) Field of Search ................................ 370/208, 210, 370/203; 708/820, 821; 330/107, 149

(56) References Cited

U.S. PATENT DOCUMENTS

| | | | |
|---|---|---|---|
| 5,237,629 A | * | 8/1993 | Hietala et al. .............. 333/138 |
| 5,293,406 A | * | 3/1994 | Suzuki ........................ 375/295 |
| 5,440,270 A | * | 8/1995 | Sevastopoulos et al. .... 330/107 |
| 5,652,772 A | * | 7/1997 | Isaksson et al. ............. 375/367 |
| 5,959,875 A | * | 9/1999 | Kawahara et al. ........... 708/821 |
| 5,987,005 A | | 11/1999 | Fertner et al. ............... 370/210 |
| 6,175,671 B1 | * | 1/2001 | Roberts ......................... 385/14 |
| 6,211,734 B1 | * | 4/2001 | Ahn ............................. 330/149 |
| 6,271,690 B1 | * | 8/2001 | Hirano et al. .................. 327/75 |
| 6,295,547 B1 | * | 9/2001 | Zhang et al. ................ 708/821 |
| 6,411,417 B1 | * | 6/2002 | Roberts et al. .............. 398/177 |

* cited by examiner

Primary Examiner—Andy Lee
(74) Attorney, Agent, or Firm—Antonio R. Durando; Quarles & Brady Streich Lang LLP

(57) ABSTRACT

Analog phase-shift elements connect each of a plurality of input nodes to each of a plurality of output nodes, wherein each component is adapted to produce a phase shift in a periodic signal processed therethrough. A linear transformation of a data set of discrete values of a given function provided as a set of analog signals to the input nodes is achieved by judiciously adjusting the signal amplitude produced at the output of the phase-shift components and summing the resulting output signals as required to simulate the transformation of interest.

29 Claims, 19 Drawing Sheets

| | | | | | | | | | | | | | | | |
|---|---|---|---|---|---|---|---|---|---|---|---|---|---|---|---|
| 0.068 | 0.189 | 0.249 | 0.326 | 0.342 | 0.374 | 0.423 | 0.467 | 0.286 | 0.165 | 0.105 | 0.028 | 0.012 | -0.021 | -0.069 | -0.113 |
| 0.286 | 0.165 | 0.105 | 0.028 | 0.012 | -0.021 | -0.069 | -0.113 | 0.068 | 0.189 | 0.249 | 0.326 | 0.342 | 0.374 | 0.423 | 0.467 |
| 0.133 | 0.318 | 0.431 | 0.564 | 0.141 | -0.133 | -0.258 | -0.125 | 0.068 | -0.077 | -0.060 | -0.016 | -0.077 | -0.109 | -0.113 | -0.125 |
| -0.197 | -0.077 | -0.060 | -0.016 | -0.077 | -0.109 | -0.113 | -0.125 | -0.197 | 0.318 | 0.431 | 0.564 | 0.141 | -0.133 | -0.258 | -0.423 |
| 0.354 | 0.729 | -0.046 | -0.512 | -0.108 | -0.108 | -0.137 | -0.171 | 0.354 | 0.062 | 0.000 | 0.000 | 0.000 | 0.000 | 0.000 | 0.000 |
| -0.062 | -0.108 | -0.137 | -0.171 | 0.354 | 0.062 | 0.000 | 0.000 | -0.062 | 0.729 | -0.046 | -0.512 | -0.108 | -0.133 | -0.137 | -0.171 |
| 0.000 | 0.000 | 0.000 | 0.000 | -0.062 | 0.729 | -0.046 | -0.512 | 0.000 | 0.000 | 0.000 | 0.000 | 0.000 | 0.000 | 0.000 | 0.000 |
| -0.108 | 0.062 | 0.000 | 0.000 | 0.000 | 0.000 | 0.000 | 0.000 | -0.108 | -0.108 | -0.137 | -0.171 | 0.354 | 0.729 | -0.046 | -0.512 |
| 0.837 | -0.483 | 0.000 | 0.000 | 0.000 | 0.000 | 0.000 | 0.000 | 0.837 | 0.000 | 0.000 | 0.000 | 0.000 | 0.000 | 0.000 | 0.000 |
| -0.129 | -0.224 | 0.837 | -0.483 | 0.000 | 0.000 | 0.000 | 0.000 | -0.129 | 0.000 | 0.000 | 0.000 | 0.000 | 0.000 | 0.000 | 0.000 |
| 0.000 | 0.000 | -0.129 | -0.224 | 0.837 | -0.483 | 0.000 | 0.000 | 0.000 | 0.000 | 0.000 | 0.000 | 0.000 | 0.000 | 0.000 | 0.000 |
| 0.000 | 0.000 | 0.000 | 0.000 | -0.129 | -0.224 | 0.837 | -0.483 | 0.000 | 0.000 | 0.000 | 0.000 | 0.000 | 0.000 | 0.000 | 0.000 |
| 0.000 | 0.000 | 0.000 | 0.000 | 0.000 | 0.000 | -0.129 | -0.224 | 0.000 | 0.000 | 0.000 | 0.000 | 0.000 | 0.000 | 0.000 | 0.000 |
| 0.000 | 0.000 | 0.000 | 0.000 | 0.000 | 0.000 | 0.000 | 0.000 | 0.000 | 0.837 | -0.483 | 0.000 | 0.000 | 0.000 | 0.000 | 0.000 |
| 0.000 | 0.000 | 0.000 | 0.000 | 0.000 | 0.000 | 0.000 | 0.000 | 0.000 | -0.129 | -0.224 | 0.837 | -0.483 | 0.000 | 0.000 | 0.000 |
| 0.000 | 0.000 | 0.000 | 0.000 | 0.000 | 0.000 | 0.000 | 0.000 | 0.000 | 0.000 | 0.000 | -0.129 | -0.224 | 0.837 | -0.483 | 0.000 |
| 0.000 | 0.000 | 0.000 | 0.000 | 0.000 | 0.000 | 0.000 | 0.000 | 0.000 | 0.000 | 0.000 | 0.000 | 0.000 | -0.129 | -0.224 | 0.000 |
| 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.837 |
| 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | -0.129 |
| 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | -0.483 |

ANALOG IMPLEMENTATION OF LINEAR TRANSFORMS

BACKGROUND OF THE INVENTION

1. Field of the Invention

This invention is related in general to devices that perform linear transformations, such as Fourier and wavelet transforms. In particular, the invention relates to a programmable analog circuit capable of performing any discrete linear transformation and its inverse.

2. Description of the Related Art

Linear transforms are very useful tools in science and technology. For example, Fourier transforms and inverse transforms are commonly utilized in many fields to analyze, design and implement signal processing, such as for defense and aerospace applications (radar, sonar, synthetic aperture radar, electronic warfare), medical diagnostic imaging (ultrasound, computed tomography, magnetic resonance imaging), telecommunications (broadband, wireless, digital video broadcasting), instrumentation and measurement (spectrum analysis, radio astronomy), and industrial vision (non-destructive testing, pattern recognition).

In all such applications, Fourier transforms are implemented with digital computers that utilize well known Discrete Fourier Transform (DFT) algorithms. For example, using current state-of-the-art processors, the algorithm known as the Fast Fourier Transform (FFT) can produce a 1024-point transform in approximately 10 $\mu$s, with a corresponding maximum data throughput of about 100 kHz. Multiple, staggered processors may be used operating in parallel in order to increase speed, but with increased power requirements that can exceed the capability of conventional bus configurations. Accordingly, the current implementation of DFT algorithms in digital computers is limited by hardware constraints.

Progress has been made in an effort to increase the processing speed of FFT algorithms by reducing the number of computations. For example, U.S. Pat. No. 5,987,005 describes an approach whereby DFT and inverse DFT operations are computed using the same computing device, thereby optimizing computational efficiency. The very high number of binary operations required to implement these algorithms and the increased power requirements associated with faster implementations remain a severe limiting factor in efforts to provide significant improvements in the speed of transform and inverse transform computation.

Therefore, there is still a need for a faster approach to the computation of linear transforms that does not also require unacceptably high power consumption. This invention has achieved this objective by effecting the transform and inverse-transform computations using analog devices.

BRIEF SUMMARY OF THE INVENTION

The invention was derived while searching for an improved approach to perform Fourier transforms and inverse Fourier transforms. Accordingly, this disclosure is based primarily on an analysis of the classical representation of discrete Fourier transforms even though it was later realized that the solution provided by the invention is equally applicable to any other linear transformation. As such, the scope of the invention is not intended to be limited to Fourier transform applications.

As well understood in the art, the algorithm implemented in digital computers to calculate the discrete Fourier transform, $F_m = F(k_m)$, of a function $f_n = f(x_n)$ is defined by the following equations, $$F_m = \frac{1}{\sqrt{N}} \sum_n^N f_n \cdot e^{\frac{-i \cdot 2\pi \cdot n \cdot m}{N}} \quad (1)$$

$$f_n = \frac{1}{\sqrt{N}} \sum_m^N F_m \cdot e^{\frac{i \cdot 2\pi \cdot n \cdot m}{N}} \quad (2)$$

wherein the indices n and m are used to refer to discrete values of x and k, respectively, and the $\sqrt{N}$ factor (or an equivalent factor) is included to normalize the transform and inverse transform and to provide symmetry, as is well understood in the art. The imaginary exponential is defined by Euler's equation, $$e^{i\phi} = \cos(\phi) + i\sin(\phi) \quad (3)$$

where $\phi = \pm 2\pi nm/N$.

In searching for an analog implementation of this DFT algorithm, it was realized that its exponential components may be modeled effectively by the phase change of an electronic wave propagating through a conductive medium (such as a waveguide).

It is known that the velocity of propagation and attenuation of signals along a waveguide are functions of the geometry and materials used in its construction. That is, once the applied signal reaches a given point on the waveguide, the signal remains unaltered but for some phase and amplitude changes related to the distance of propagation. For example, referring to a waveguide of length L, as illustrated in FIG. 1, a sinusoidal input signal $V_0(t)$ may be represented by the exponential relation $$V_0(t) = V_0 e^{i\omega t}. \quad (4)$$

where $V_0$ is the maximum amplitude of the input signal; $\omega = 2\pi f$, f being the frequency of oscillation; and t is time. The output signal at the distance L along the waveguide thus can be represented by the equation $$V_L(t) = V_0(t) A(L) \exp(-i\omega L/v), \quad (5)$$

where v is the velocity of propagation and A(L) is a parameter used to indicate the signal attenuation resulting from waveguide losses.

Equation 5 shows that any desired phase change can be obtained through a waveguide by judiciously selecting its length L. For example, as illustrated in FIG. 2A, the input to a single source (point m) can be used to provide a plurality of signals of various amplitudes and phases at a plurality of output points (1–5) simply by channeling the input signal at point m through waveguides of various lengths (L1–L5). Similarly, as shown in FIG. 2B, the output at a single output point (point n) can be derived from a plurality of signals of various amplitudes and phases at a plurality of source points (1–5) simply by selecting the output signals at point n from waveguides of various lengths (L1'–L5'). Using Equation 5, the output signal at each output node n can be represented as $$V_n(t) = V_0(t) A_n \exp(-i\omega L_n/v), \quad (6)$$

where $A_n$ and $L_n$ are the signal attenuation and waveguide length, respectively, corresponding to output node n. Apply ing the principle of wave superposition to the illustrations of FIGS. 2 and 3 yields the equation $$V_0(t) = \sum_n \frac{V_n(t)\exp(i\omega L_n/v)}{A_n}, \quad (7)$$

where $1 \leq n \leq N$.

If the length of a waveguide, $L_n$, is selected such that $$L_n = (2\pi n v)/(\omega N), \quad (8)$$

then Equation 7 becomes $$V_0(t) = \sum_n \frac{V_n(t)\exp(i2\pi n/N)}{A_n}. \quad (9)$$

$V_n(t)$ can be expressed in conventional manner as a function of its maximum amplitude $V_n$ as follows, $$V_n(t) = V_n e^{i\omega t}. \quad (10)$$

Combining Equations 4 and 10 with Equation 9 yields $$V_0 e^{i\omega t} = e^{i\omega t} \sum_n \frac{V_n(t)\exp(i2\pi n/N)}{A_n},$$

which simplifies to $$V_0 = \sum_n \frac{V_n(t)\exp(i2\pi n/N)}{A_n}. \quad (11)$$

This equation illustrates that the input signal at point 0 in FIG. 2 can at all times be represented by a linear combination of corresponding output signals at the end of N waveguides having lengths selected according to Equation 8, wherein respective amplitude attenuations $A_n$ have been empirically measured or calculated and introduced in the circuit to match the particular equation of interest.

The present invention is based on the recognition that Equation 11 has the same form as the mathematical representation of a discrete Fourier transform (Equation 1) and that, as such, it can be used advantageously to model the transform in an analog implementation. Carrying the concept forward to a total of M input nodes, each input node m may be connected to N output nodes by specific lengths of waveguides, as illustrated in FIG. 3, so that N output signals may be obtained from the waveguides, each being attenuated and phase shifted with respect to the signal of the sine wave source. Without loss of generality, it is understood M and N will normally be equal for a transform that yields maximum information. Therefore, such identity is assumed in the analysis that follows even though it is not critical to the invention. If the waveguide length between each input node m and each output node n is selected such that $$L_{mn} = \frac{2\pi n m v}{\omega N}, \quad (12)$$

the same analysis used above with respect to a single output node yields the general relation $$V_n = \sum_m V_0 A_m \exp(i\varphi_m)\exp(-i2\pi n m/N) \quad (13)$$
$$= \sum_m V_m \exp(-i2\pi n m/N)$$

where $\phi_m$ is the phase of the $m^{th}$ input signal. This equation has the identical form of a Discrete Fourier Transform (DFT).

As one skilled in the art would readily recognize, phase changes that are integral multiples of $2\pi$ produce equivalent output signals (that is, phase changes of $2 k\pi$, where k is any integer, are equivalent). Therefore, Equation 12 can be written without loss of generality as $$L_{m,n} = \frac{2\pi[\text{mod}(mn, N)]v}{\omega N}, \quad (14)$$

where mod(x,y) is defined as the remainder of the integral division of x by y. Using this idea of equivalent phase changes to compute the Inverse Discrete Fourier Transform (IDFT), the corresponding waveguide lengths can also be computed with the following, which provides the equivalent of the complex conjugate of the imaginary exponential:

$$L^+_{m,n} = \frac{2\pi[N - \text{mod}(mn, N)]v}{\omega N}. \quad (15)$$

An analysis of the speed of operation of such a waveguide implementation of a linear transform indicates an improvement of several orders of magnitude with respect to digital devices. Rearranging Equations 14 and 15 to determine the time required for the phase-shifted signals to reach the output, the maximum time is given by the relation $\Delta t = 2\pi/\omega = 1/f$, f being the frequency of oscillation of the sine wave source. Using a radio frequency of about 10 MHz, which is moderate for modern signal generators, the computation time for a complete DFT or IDFT would be about 100 ns, which is two orders of magnitude faster than achievable with current state-of-the-art FFT processors. Using operating frequencies currently available for high-speed microprocessors (about one GHz), the computation time would be reduced to 1 ns, two additional orders of magnitude improvement. Furthermore, because of the parallel operation of the system, the computational speed is the same for any number N of input and output nodes.

The power requirements of the invention have been found to be similarly advantageous over prior-art digital implementations. In order to express Equation 5 with the waveguide configuration of FIG. 3, each waveguide signal needs to be attenuated by a normalization factor, such as $1/\sqrt{N}$. It is noted that any other normalization factor, such as 1/N, could be used in equivalent fashion so long as suitable to avoid clipping of the output signals. Since such an amplitude attenuation is not likely to be produced by the waveguide itself, a post-waveguide circuit may be used which superimposes and attenuates the signals from each waveguide. For example, the output circuit illustrated in FIG. 4 utilizes a summing amplifier S to combine the output of a plurality of nodes and produces the desired attenuation by the appropriate selection of resistors R. Such a summing amplifier circuit can be designed with extremely small power requirements. Therefore, assuming a current requirement of about 10 micro amps per termination circuit, the total power requirement for a 1024-node system would be about 100 mW, two orders of magnitude smaller than current state-of-the-art digital devices.

The relation expressed in Equation 11 with reference to the analog circuit of FIG. 3 illustrates that the DFT equation (Equation 1) can be simulated exactly by attenuating the voltage signal through each waveguide by the quantity $1/\sqrt{N}$. As indicated, the required attenuation may be achieved by post-waveguide processing, as shown in FIG. 4, producing an analog-circuit configuration suitable for implementing both DFT and IDFT operations. In addition, because this analog circuit is generally suitable to model linear combinations of periodic functions, it can be used generally to express any set of linear-transform values that correspond to a discrete set of function data simply by adjusting the waveguide lengths and signal amplitudes.

Therefore, in most general terms, the invention consists of analog phase-shift components connecting each of a plurality of input nodes to each of a plurality of output nodes, wherein each component is adapted to produce a phase shift in a periodic signal processed therethrough. A linear transformation of a data set of discrete values of a given function provided as a set of signals to the input nodes is achieved by judiciously adjusting the signal amplitude produced at the output of the phase-shift components and summing the resulting output signals as required to simulate the transformation of interest. As a special case of the invention, those skilled in the art will recognize that real transforms can be implemented simply with two lengths of waveguide providing $\pi$ and $2\pi$ phase shifts, respectively, and common phase inputs (constant $\phi_m$).

It is noted that the purpose of computing a Fourier transform can be simply one of analysis, such as for determining the frequencies that comprise a signal. However, more general uses of the transformed data exist. For example, in order to filter all but a few frequencies of a signal, it is a simple matter to perform a DFT on the signal and then an IDFT of only the desired frequencies. This type of operation provides an ideal filter that can eliminate noise or unwanted information from a signal and the present invention, because of its flexibility of implementation, is advantageously suited for this type of application.

Referring to FIG. 5, a two-stage system is provided for performing general phase-space computations. As disclosed above, the input nodes are set to represent the data to be operated on. The output nodes of the first stage (Stage 1 in the figure) provide the Fourier transform of those data. A second-stage computation block (Stage 2 or Mask Section in the figure) then operates on the DFT in the transform domain and provides the results to a third stage (Stage 3). Finally, Stage 3 performs an IDFT and gives the result of the desired calculation in the domain of the original data. For the filtering operation discussed above, the computation block (Mask Section) simply inhibits the transfer of certain stage-one output nodes to stage three. More complex calculations, such as convolutions, correlations, matrix-vector multiplications, or linear predictions can also be implemented either as hard-coded or programmable configurations of Stage 2. Those skilled in the art will readily recognize that other linear transforms may be similarly operated on and inverse transformed to the original function's domain.

It is also noted that the implementation of the invention disclosed above incorporates independent waveguides between each input and output nodes. Therefore, any structure capable of providing the phase-shift effect of a waveguide, such as a planar geometry, could be used in equivalent manner to implement a DFT. In addition, the phase-delay network can be implemented using either passive or active components. Programmable impedance devices may also be used to implement, alter, or tune the input, Stage-1, Stage-2, or Stage-3 sections.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 15 is a table of the transformation matrix produced by DAUB04 as the "mother" wavelet function in a 16-element space. The table is used to determine resistance values and tap points to compute a wavelet transform.

DESCRIPTION OF THE PREFERRED EMBODIMENTS OF THE INVENTION

Figure 1:
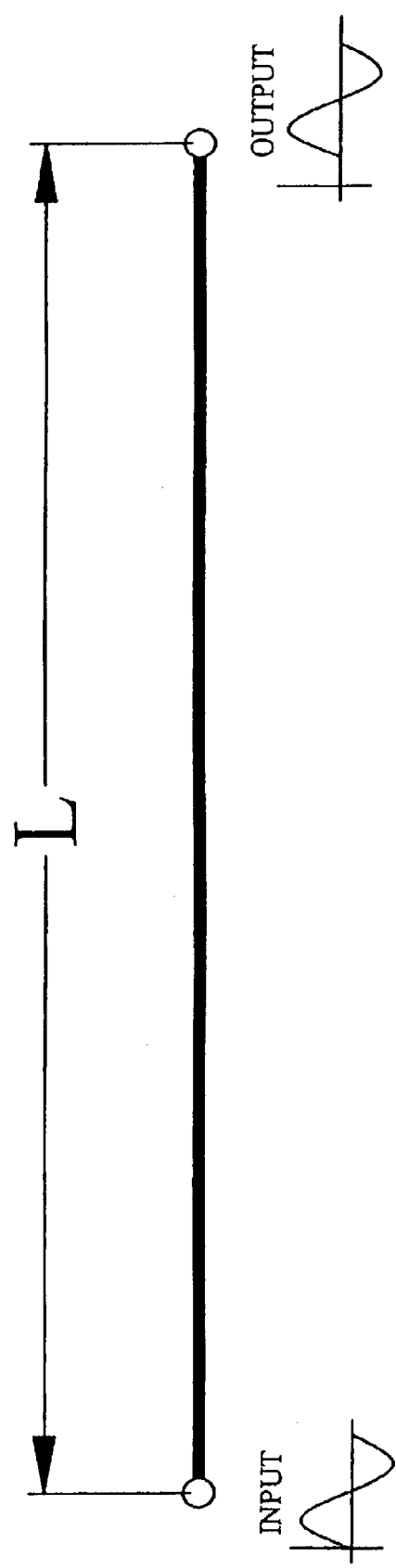
FIG. 1 is a schematic illustration of a sinusoidal input signal fed through a waveguide and a phase shift produced at an output node along the waveguide.
Figure 2A:
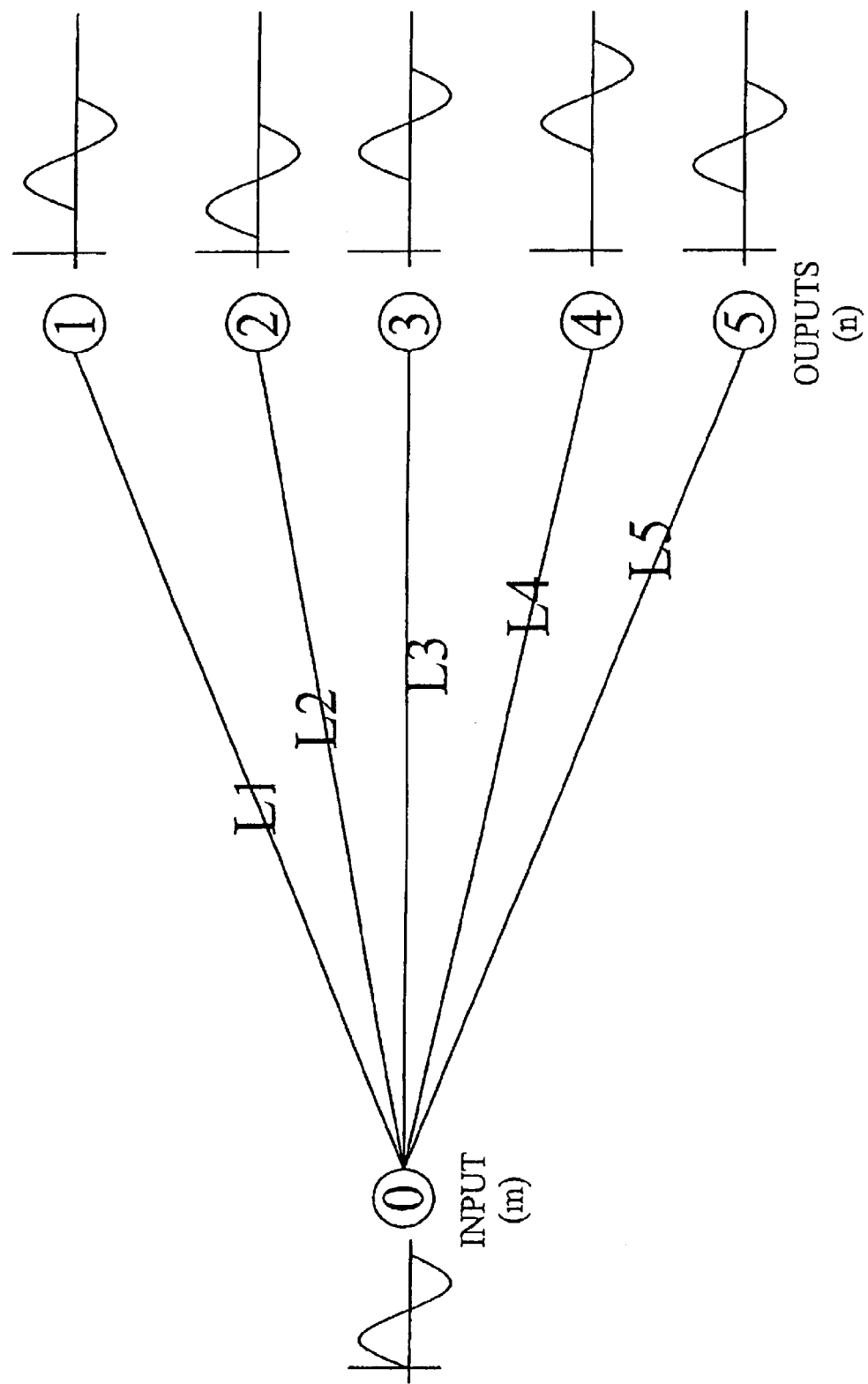
FIG. 2A is a schematic illustration of multiple waveguides of varied lengths connecting a single input node to multiple output nodes, and of the related phase shifts produced by each waveguide on a sinusoidal input signal.
Figure 2B:
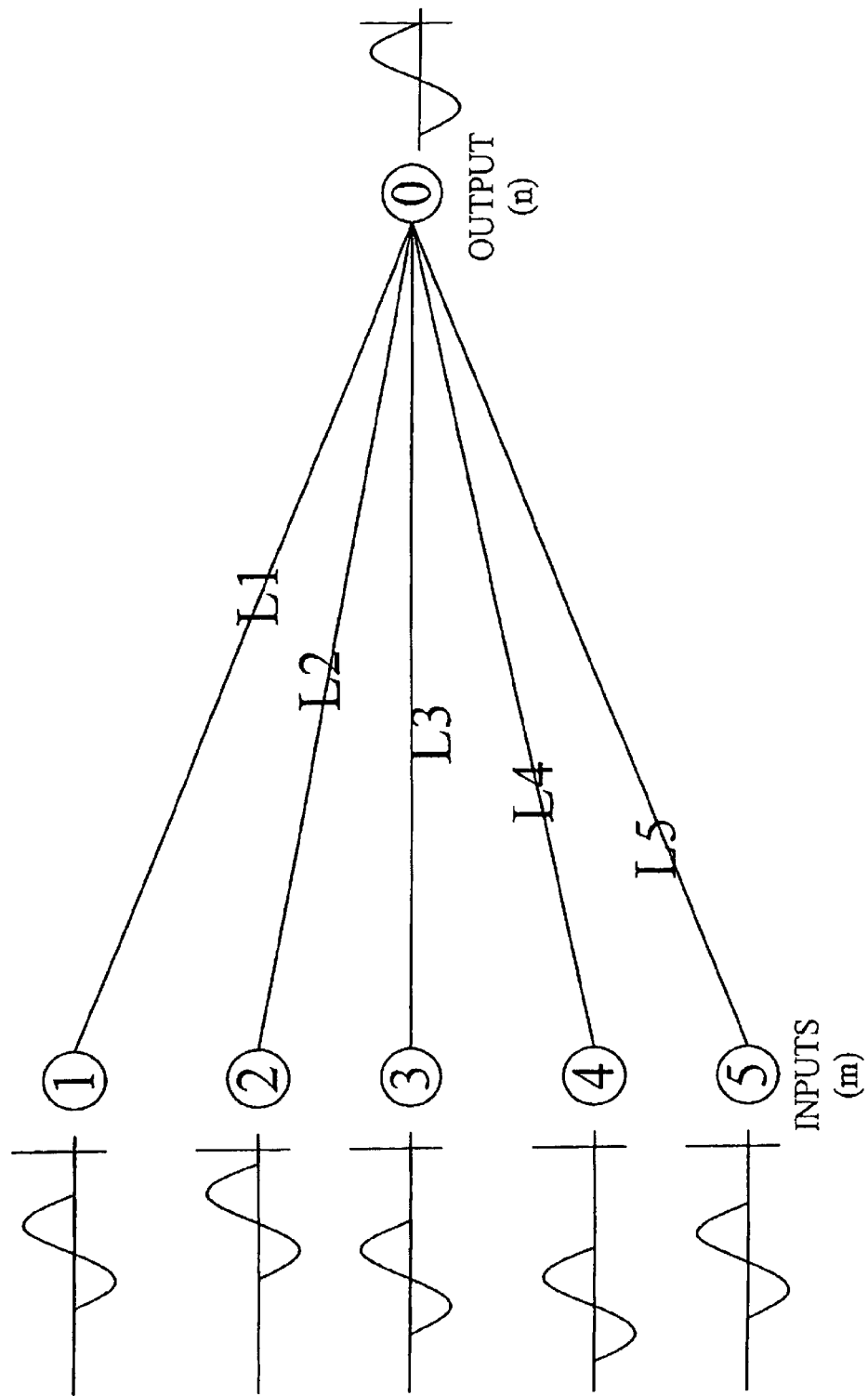
FIG. 2B is a schematic illustration of multiple waveguides of varied lengths connecting a single output node to multiple input nodes of varying phase shifts producing an output of superposed phase-shifted inputs.
Figure 6:
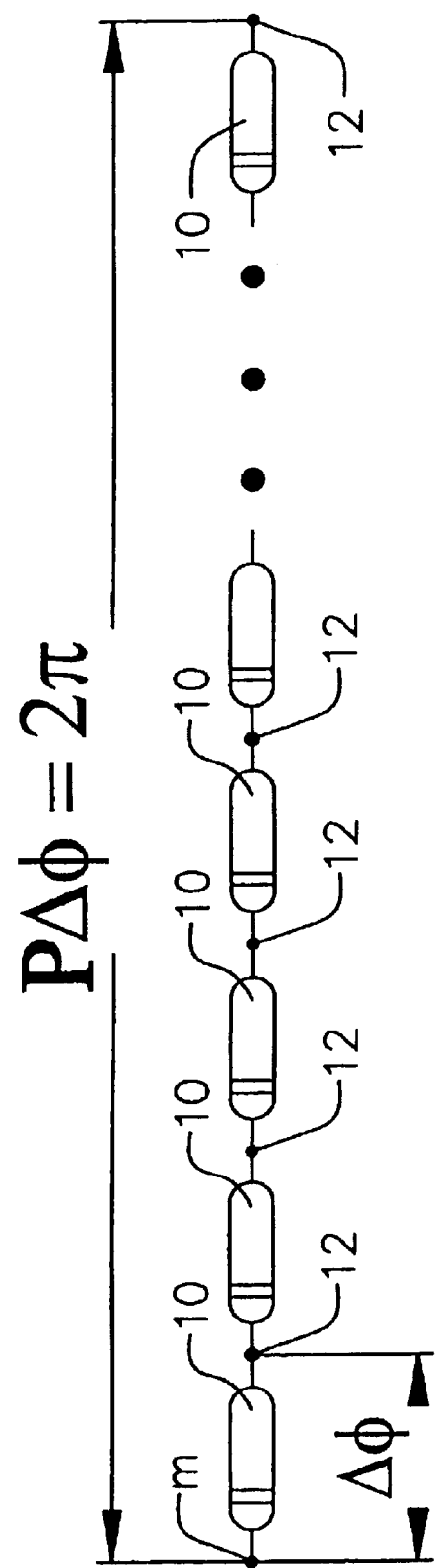
FIG. 6 is a schematic representation of a circuit consisting of a series of P fractional phase shift elements adding up to a total phase shift of $2\pi$ radians.

The preferred embodiment of the invention is based on the general concept outlined above and the further realization that, inasmuch as phase changes of integral multiples of $2\pi$ are not detectable, the domain of phase changes $\Delta\phi$ occurring in a signal traveling through a waveguide are given by the relation $$\Delta\varphi_{m,n} = \frac{2\pi[\mathrm{mod}(mn, N)]}{N}, \quad (16)$$

where mod(x,y) refers to the remainder of the integral division of x by y. This equation describes N equally spaced phase changes of increment $2\pi/N$, which can be implemented in a network simply by using P (=kN, where k is an integer) phase-shift elements as illustrated in FIG. 6. Such a circuit may be tapped at any point 12 between fractional phase-shift elements 10 to acquire the desired shifted signal. It is clear that this serial circuit is equivalent to the waveguide configuration of FIG. 2. Each output of waveguide in FIG. 2 corresponds to a tap point 12 in FIG. 6.

Figure 3:
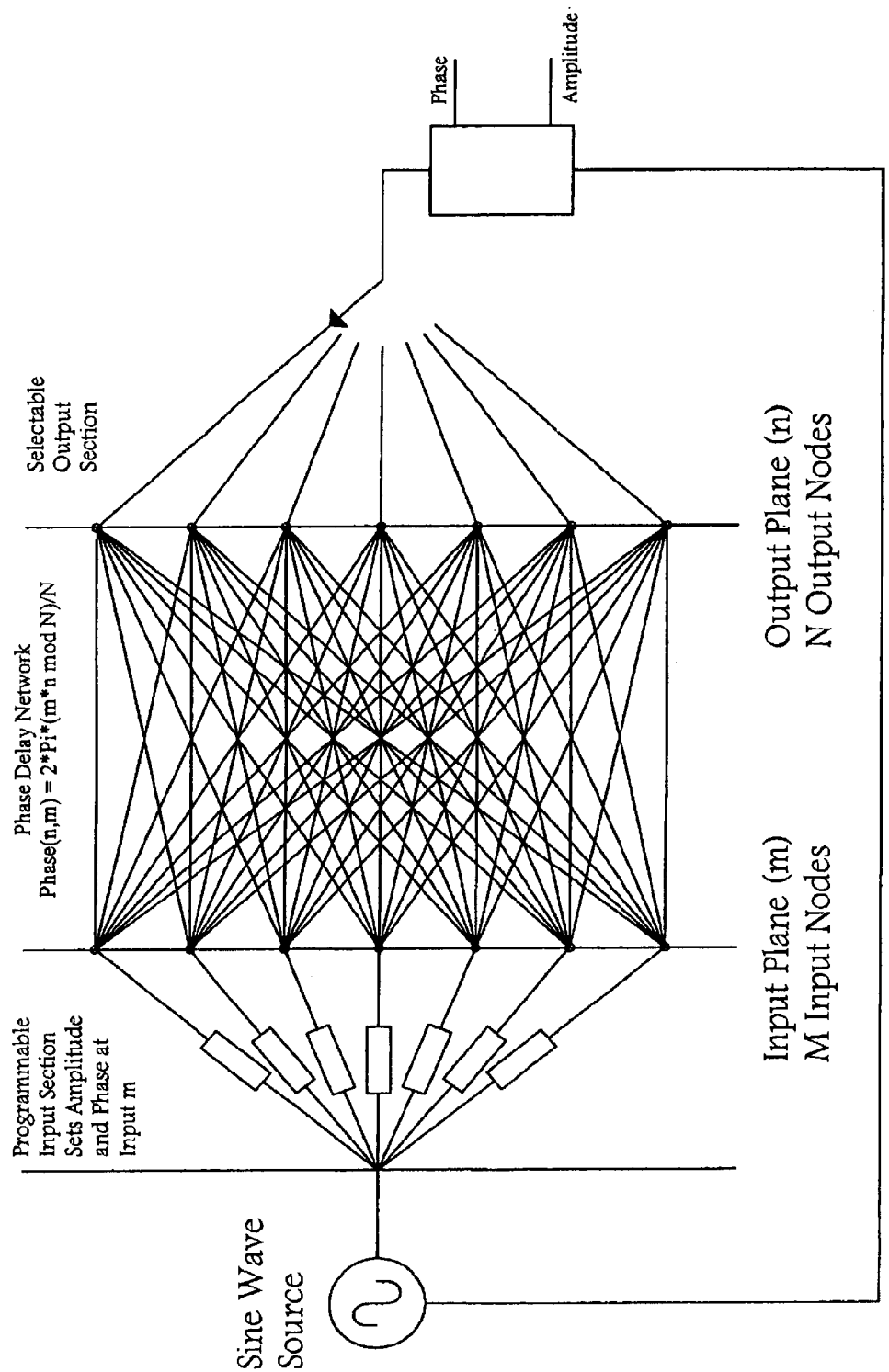
FIG. 3 is a schematic diagram of the circuit of FIG. 2 extended to multiple input and output nodes, and further including a programmable input section for varying the amplitude and phase of a periodic signal fed to each input node and a selectable output section for selectively providing the amplitude and phase of the output node of interest.
Figure 4:
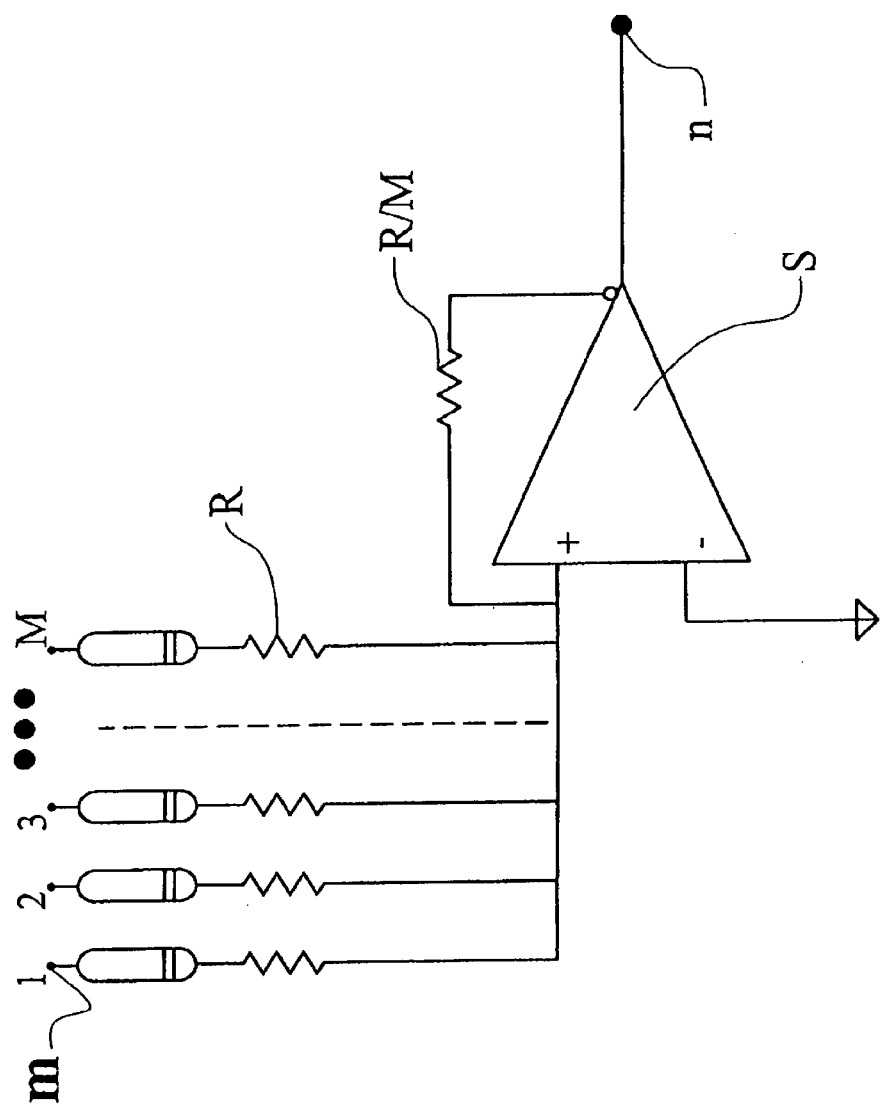
FIG. 4 is a schematic representation of an exemplary waveguide termination circuit for combining and attenuating the signals at the output nodes of the phase-shift system of FIG. 3.
Figure 5:
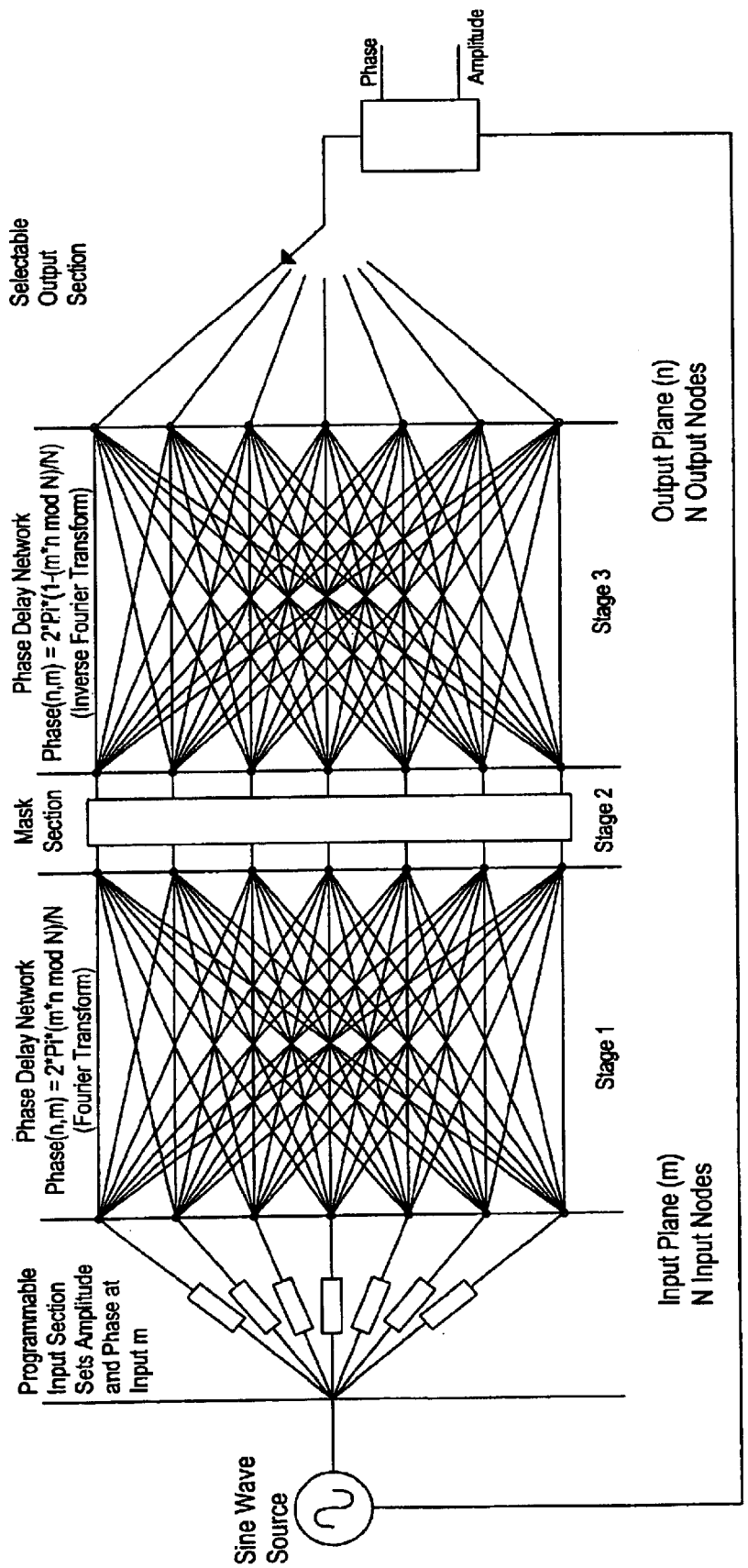
FIG. 5 is a waveguide implementation of a system for performing transform-space calculations.
Figure 7:
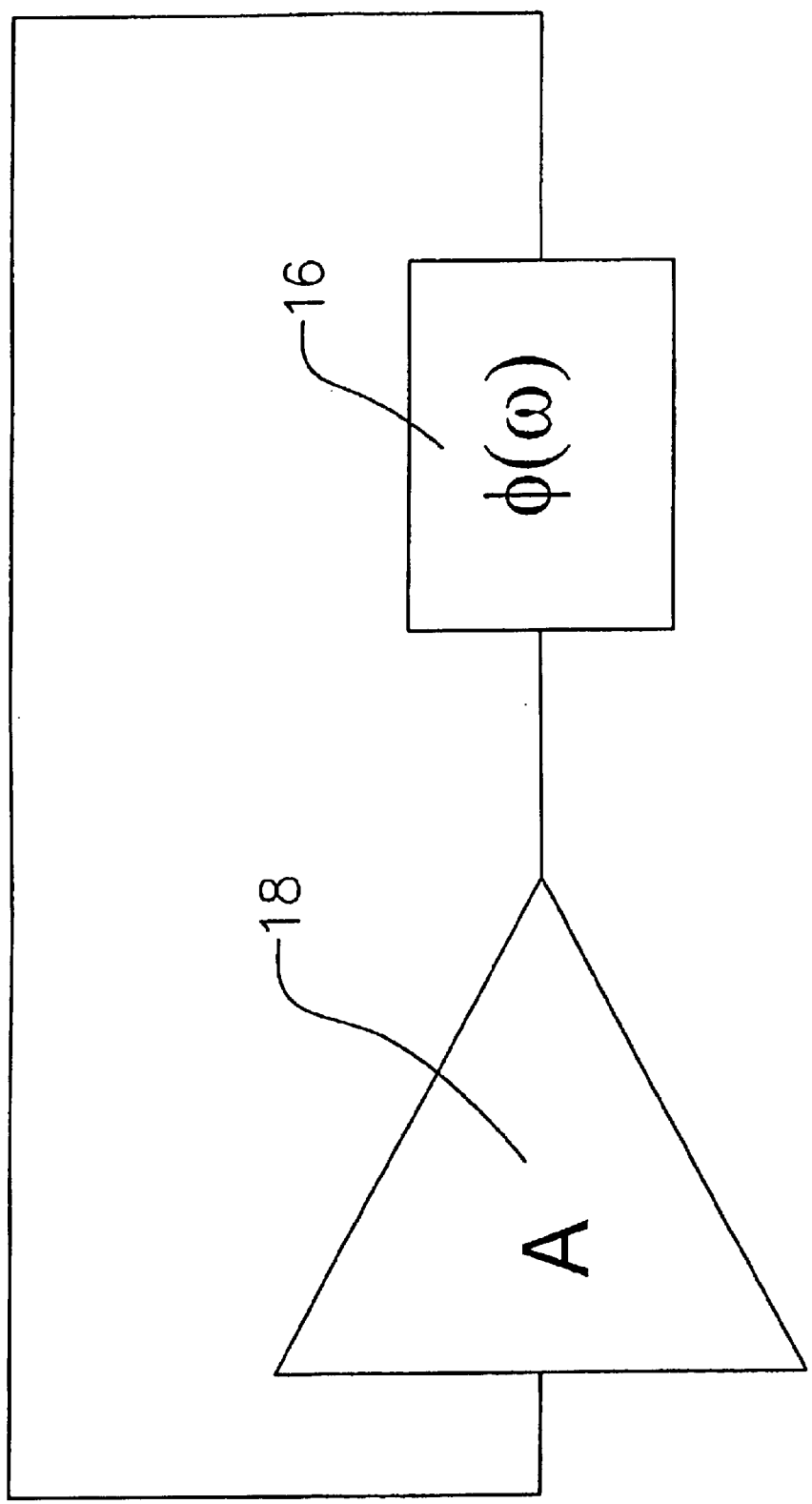
FIG. 7 is a schematic illustration of a phase-shift circuit wherein the phase-shifted output is used as a positive feedback to an amplifier in order to generate the oscillating frequency needed for stable operation.

Thus, the multi-input-node linear transformation circuit of FIG. 3 can be implemented using M serial circuits of the type described in FIG. 6. Because electronic phase-shift elements are usually frequency dependent, an exact $2\pi$ overall phase shift can only be provided by an oscillator circuit operating at the proper frequency. Thus, according to another aspect of the invention, the exact frequency may be produced by the use of a feedback loop in the phase-shift circuit itself, as illustrated in FIG. 7. As is well understood in the art, the output of an amplifier 18 that is phase shifted by a frequency-dependent network 16, such as the one illustrated in FIG. 6, is fed back to the amplifier. When the circuit is first powered up, the only signal present at the amplifier's input is due to wide-band thermal oscillations in the circuit's components. This random signal is amplified, phase shifted, and continuously amplified and phase shifted again in closed loop. Thus, the input signal to the amplifier 18 can be written mathematically as $$F(t) = \int A^t e^{i\phi(\omega)t} \int f(\omega) e^{i\omega t} d\omega dt, \quad (17)$$

where the internal integral is simply the Fourier transform of the original thermal noise.

If the amplification, A, is set to reduce to unity after a predetermined peak signal is attained, Equation 17 becomes $$F(t) = \int f(\omega) \int e^{i\phi(\omega)t} e^{i\omega t} dt d\omega. \quad (18)$$

Figure 8:
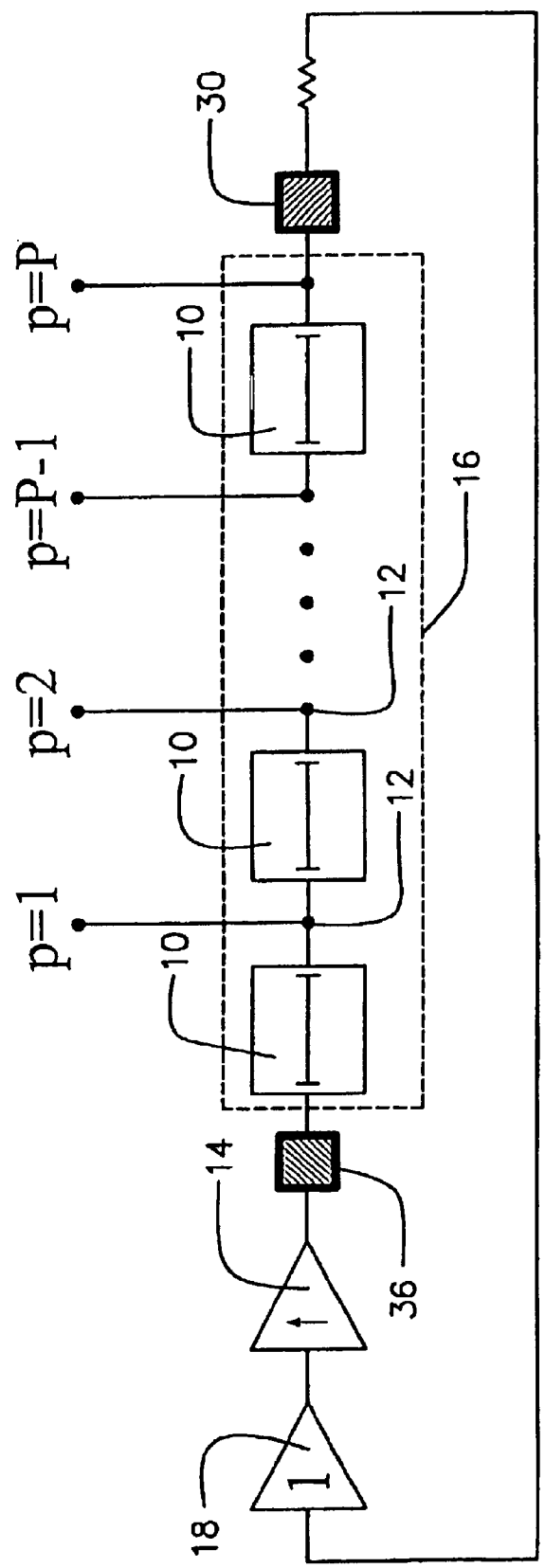
FIG. 8 is a schematic illustration of a serial fractional phase-shift circuit that includes a signal-producing oscillation amplifier, an amplitude-management amplifier, a phase-management circuit, a phase-cancellation circuit, and P phase-shift elements with corresponding tap points.

As one skilled in the art would readily appreciate, as a result of the orthogonal property of imaginary exponential functions, $\omega = \phi(\omega)$, which means that the two imaginary exponentials are in phase. In turn, this means that $\phi = 2$ n$\pi$. Therefore, simply by using the output of the series phase delay network as positive feedback to reduce to a unity-gain amplifier, the proper oscillation for the network of the invention is automatically created. Thus, applying this concept to the fractional phase-shift circuit of FIG. 6 provides an implementation suitable to practice the invention. As illustrated in FIG. 8, an oscillator amplifier 18 is used to produce a sine-wave signal based on the phase-delay elements 10. The frequency of oscillation is selected such that the N fractional phase-shift elements 10 in the serial circuit 16 produce a total phase shift of $2\pi$ (whether or not the elements 10 are equal) or, equivalently, a total phase shift of $2$ k$\pi$, where k is any integer. The amplitude-management amplifier 14 is used to limit the amplitude of oscillations to a programmable value. The phase-management circuit 36 is used to provide an additional programmable phase shift of signals into the serial phase-shift circuit 16. The phase-cancellation circuit 30 is used to nullify the phase induced by element 36. Thus, the total phase shift of the circuit is only that due to the serial phase-shift circuit 16. The serial fractional phase-shift circuit 16 includes P phase-shift elements 10 adapted to provide a total phase shift of $2\pi$ radians, each element preferably contributing identical phase shifts. In such case, each of P phase-shift tap points 12 provides the oscillator signal phase shifted by 2 p$\pi$/P radians (wherein the notation p is also used here to indicate the integer index corresponding to the tap point location in the circuit 16).

Figure 9:
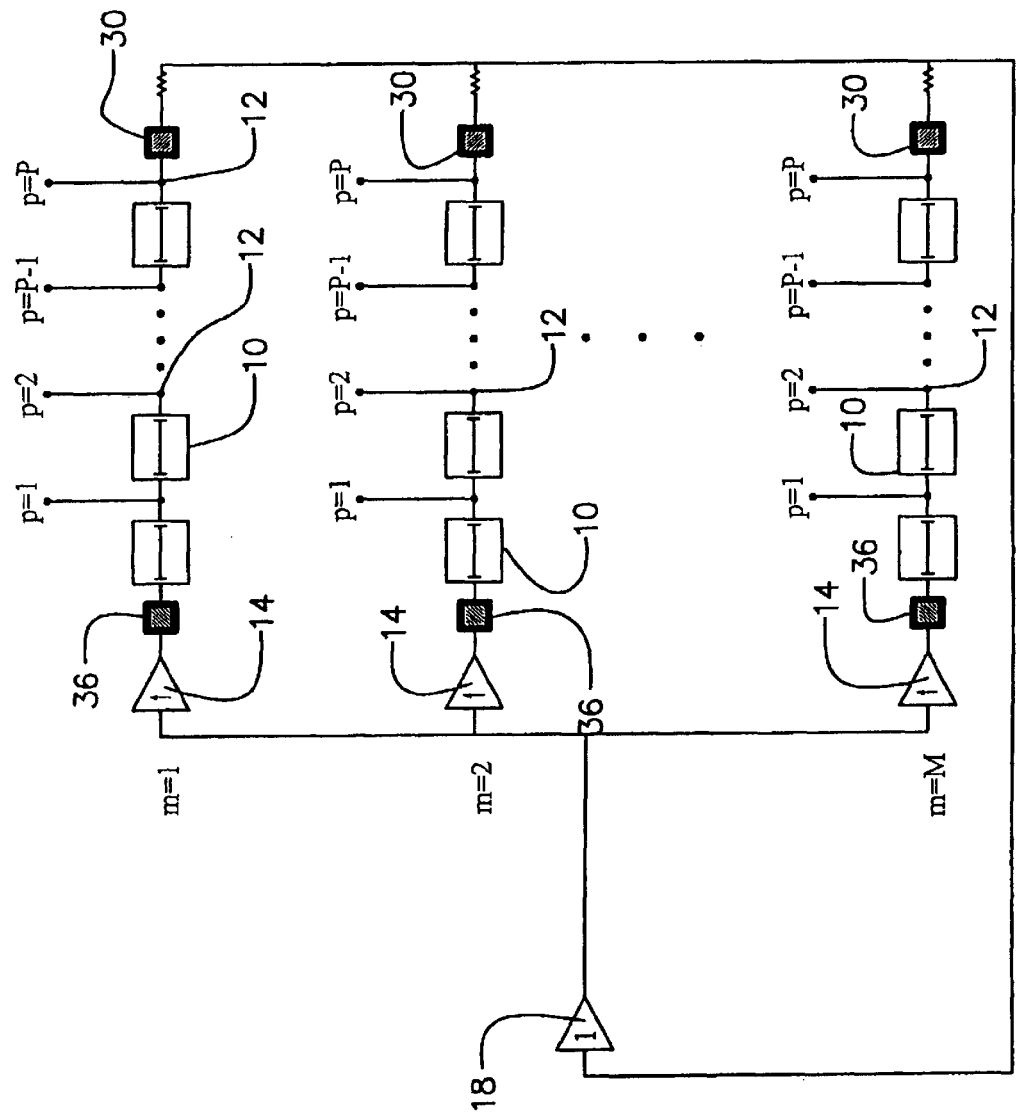
FIG. 9 is a schematic illustration of a network array of fractional phase-shift elements obtained by connecting in parallel M serial circuits of P elements each, as described in FIG. 8, with a common oscillation amplifier.

As illustrated in FIG. 9, the preferred embodiment of the invention is implemented by connecting M serial circuits 16 in parallel, wherein each circuit includes a corresponding amplitude-management amplifier 14, a phase-management circuit 36, and a phase-cancellation circuit 30. In order to avoid clipping of the signal, which would result from the fact that the unity-gain oscillation amplifier 18 is now common to all signal generator legs, the amplifier 18 is modified to be instead a signal-average gain amplifier, i.e., to produce a gain of 1/N. Thus, the configuration of FIG. 9 produces an M×P network array of phase-shift elements 10, each having a corresponding tap point. For convenience of illustration, each tap point is referred herein by the index (m,p), where m is an integer ($1 \leq m \leq M$) that denotes the position of the serial circuit 16 in the array (i.e, the row number) and p is an integer ($1 \leq p \leq P$) that denotes the position of the element 10 and its corresponding tap point in the $m^{th}$ serial circuit 16 of the network array (i.e., the column number in the array).

Figure 10:
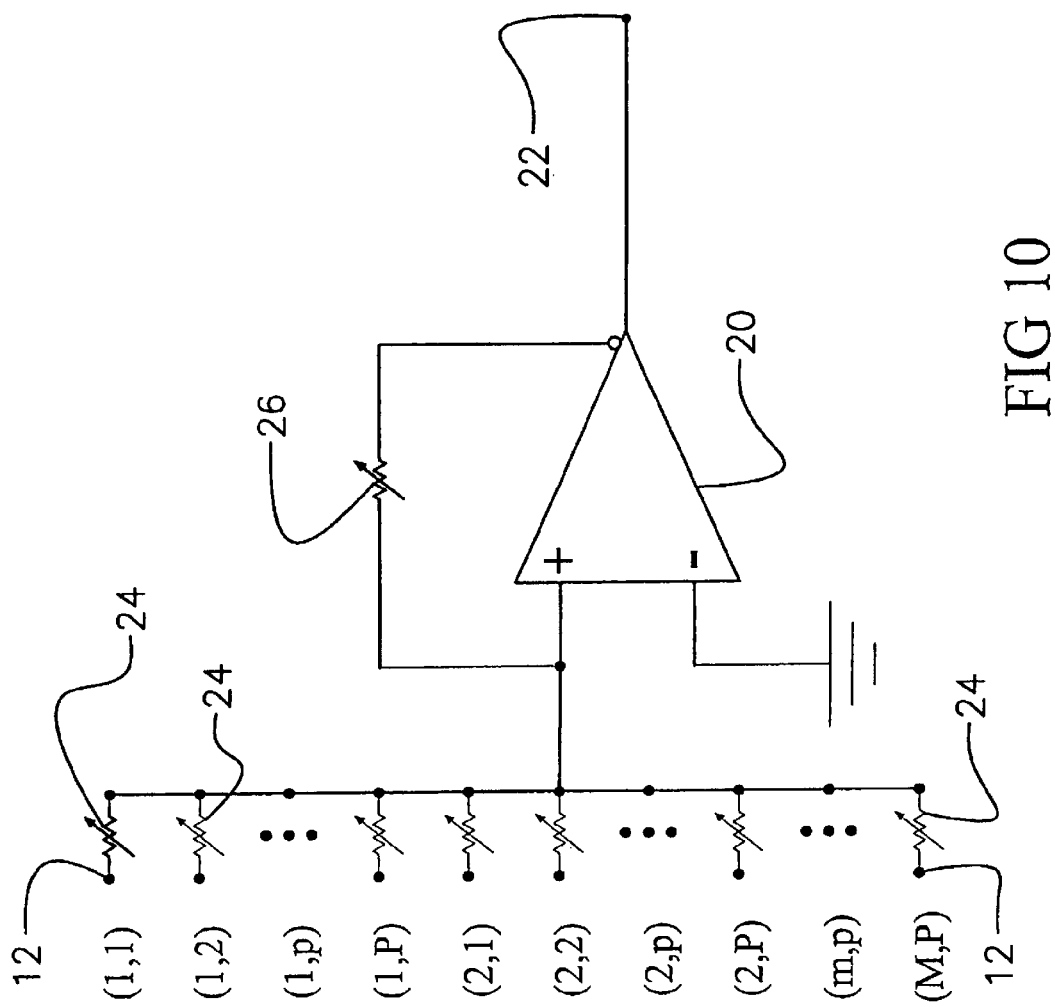
FIG. 10 is a schematic illustration of a circuit suitable for combining all output signals obtained from the various tap points of the array of FIG. 9 in order to produce an output element of the linear transform according to the invention.

FIG. 10 illustrates the manner the output signals obtained from various tap points (m,p) may be connected to a summing amplifier 20 to produce each output point 22 of a linear transform according to the invention. The amplitude of the output signal from each tap point 12 is adjusted by a corresponding, possibly programmable, amplitude-modification resistor 24. Such M×P array of resistors provides general flexibility to set the weight that each phase-delayed signal contributes to the linear transform output value at point 22. An infinite resistance may be implemented advantageously by no connection to the (m,p) tap point of interest or by a very large resistance value. A possibly also programmable output-gain resistor 26 is connected in feedback loop to the summation amplifier 20 to control the amplitude of the output signal at point 22 and is set to a value that ensures the output signal is not clipped. It is noted that a programmable system, while preferred for general application, may not be economical in cases when fixed values are sufficient.

Figure 11:
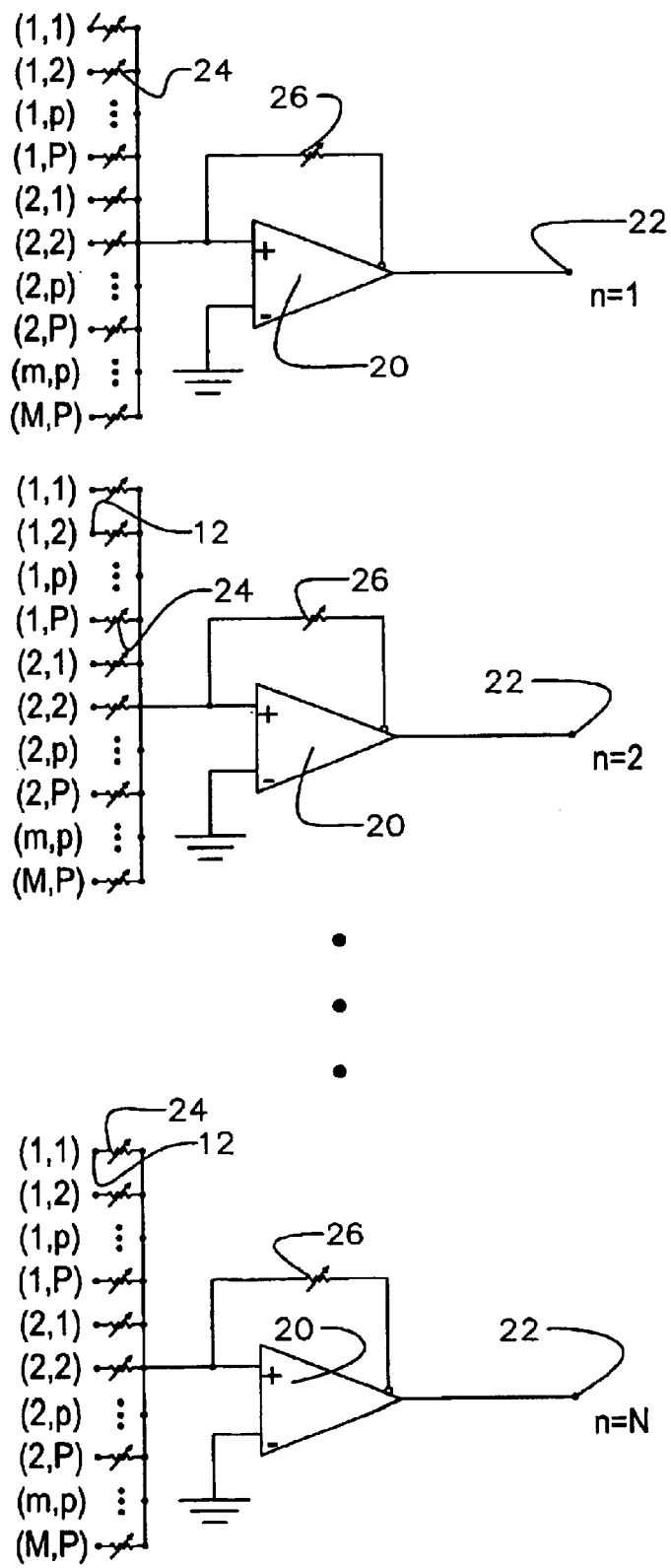
FIG. 11 is a schematic illustration of a parallel connection of multiple circuits of the type shown in FIG. 10 to the array of tap points of FIG. 9, each with a separate array of corresponding amplitude-modification resistors feeding a respective summing amplifier, so as to produce a vector of output elements of the linear transform according to the invention.

Based on the array output configuration illustrated in FIG. 10, it is clear that a network of most general application may be implemented simply by duplicating the circuit in that figure multiple times, each time to produce a different output value corresponding to an element of a desired linear transform. As illustrated in FIG. 11, each circuit is connected in parallel to the array of tap points 12 with a separate array of corresponding amplitude-modification resistors 24 feeding a respective summing amplifier 20. Thus, each output node 22 produces an output signal that depends on the specific selection of values for the corresponding resistors 24 that modify the amplitude of the phase-shifted signals received from the array of corresponding phase-shift elements 10. For a system with N output nodes, the circuit of FIG. 10 is duplicated and tapped into the array of FIG. 9 N times. This implementation of the invention is illustrated in FIG. 11, where the index n ($1 \leq n \leq N$) is used to refer to the order of each output node 22 in the output section of the invention.

If the amplitude-management amplifier 14 (see FIG. 9) of each phase-shift circuit 16 of the phase-shift array sets the amplitude at a value $A_n$, and the phase-management circuit sets the phase at a value $\phi_m$, the output signal for the $m^{th}$ transform element, $O_n$, will be given by the relation $$O_n = \sum_m^N A_m \exp(i\varphi_m) \sum_p^N \frac{R_{g,n}}{R_{m,n,p}} e^{-i2\pi p/N}. \tag{19}$$

where $R_{m,n,p}$ is the signal amplitude-modification resistor 24 tapped into the $p^{th}$ phase-shift element 10 of the $m^{th}$ phase-shift circuit 16 to contribute to the $n^{th}$ output signal, $O_n$, at a corresponding $n^{th}$ output node 22; and $R_{g,n}$ is the gain resistor 26 for the corresponding $n^{th}$ element of the transform vector of points. If $R_{m,n,p}$ is selected such that $$R_{m,n,p} = \frac{K}{\delta(p - mn - \gamma_m)}, \tag{20}$$

where $\delta(x=0)=1$, $\delta(x \neq 0)=0$, K is a reasonable resistance value, and $\gamma_m$ is a constant; and if $R_{g,n}$ is set equal to K/N, the output $O_n$ then becomes $$O_n = \frac{1}{N} \sum_n^N A_n \exp[i(\varphi_m - 2\pi\gamma_m/N)] \exp[-i2\pi mn/N], \tag{21}$$

which is readily identified as the discrete Fourier transform of the N-element set $$A_n \exp[i(\phi_m - 2\pi\gamma_m/N)]. \tag{22}$$

Since all indices, including p, are limited to integral values, $\gamma_m$ is similarly restricted. Moreover, phase shifts of multiples of $2\pi$ are undetectable and, therefore, can be discarded. Therefore, a programmable value for the required resistance may be obtained by the formula $$R_{m,n,p} = \frac{K}{\delta[p - mod(mn + \gamma_m, N)]}. \tag{23}$$

As discussed above, it is possible to obtain phase-shifted signals from an N-element phase-shift oscillator. However, Equation 1 indicates that it is also necessary to control the complex-valued signal amplitude in order to implement the linear transform device of the invention. Equation 22 indicates that $\gamma_m$ and $\phi_m$ are available to encode the phase component of the complex input, $\gamma_m$ being simply an offset along the linear chain of phase-shift elements. However, use of $\gamma_m$ to encode the input complex number would require runtime selection of the access points in the phase-shift network, which may be impractical. Therefore, a choice of $\gamma_m=0$ and the use of a "programmable" phase shift, $\phi_m$, at each input node may be adopted for implementation of the invention's input encoding scheme, as illustrated in the phase-management circuit 36 of FIG. 12. A phase-cancellation circuit 30 is provided to ensure a total phase shift due only to the phase-shift network, uninfluenced by the phase-management circuit 36.

Figure 12:
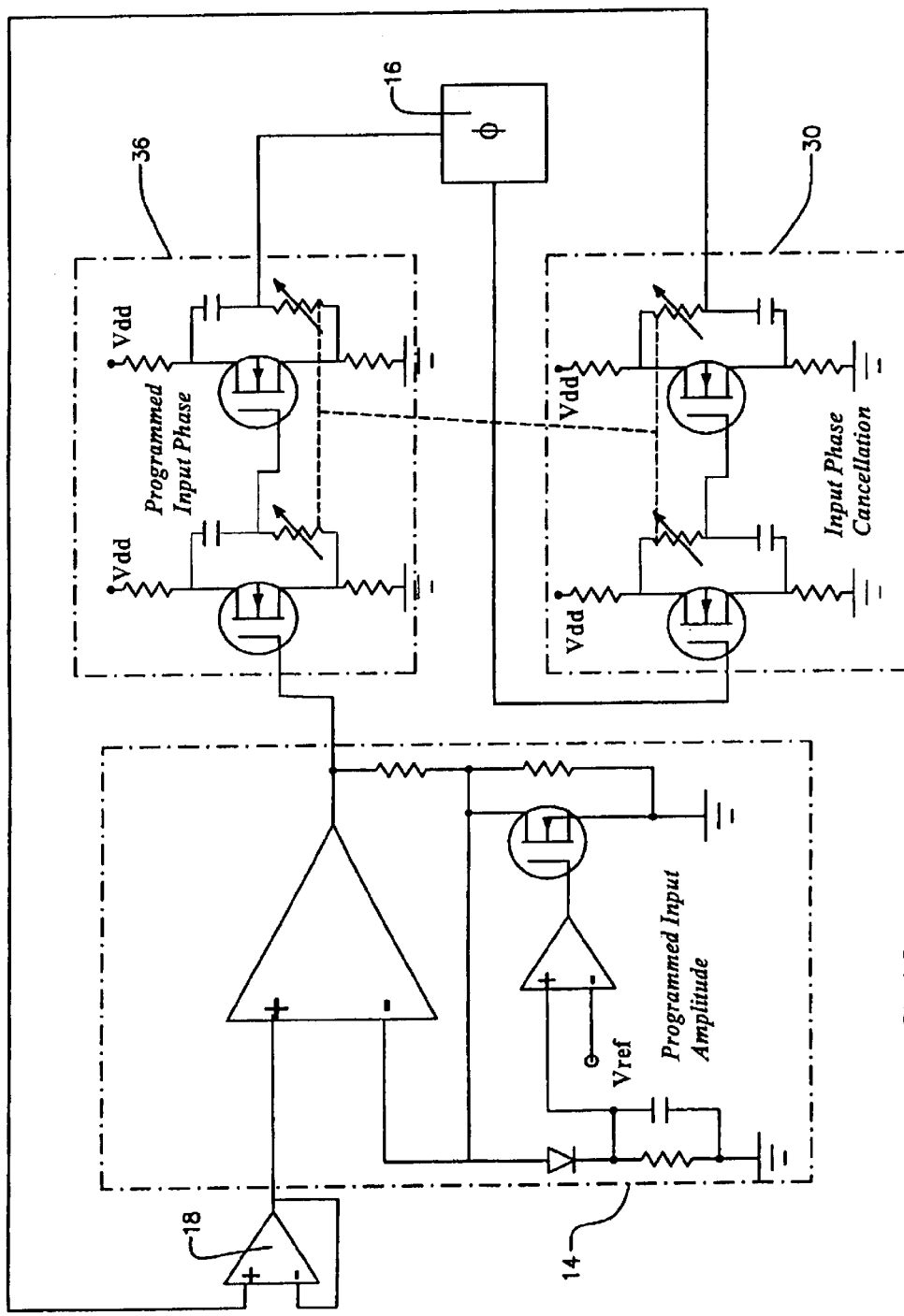
FIG. 12 is an example of an amplitude-management circuit, a phase-management circuit, and a phase-cancellation circuit as required by FIG. 8.

The real-valued amplitude at each input node is not so readily encodable as $\gamma_m$. Since a phase-shift oscillator's signal amplitude is only limited by the available voltage supply, the amplifier circuit must be designed to limit the gain of the entire circuit, including phase-shift elements, to unity. The amplitude at which this condition is satisfied may be manipulated by the circuitry. In essence, the amplifier circuit must adjust the overall gain to unity at the value of amplitude desired. Such a design can be realized with a peak detector and comparator adjusting the amplifier gain. FIG. 12 shows a possible implementation of such a programmable input-amplitude circuit 14, where the amplitude is programmed by $V_{Ref}$.

Figure 13:
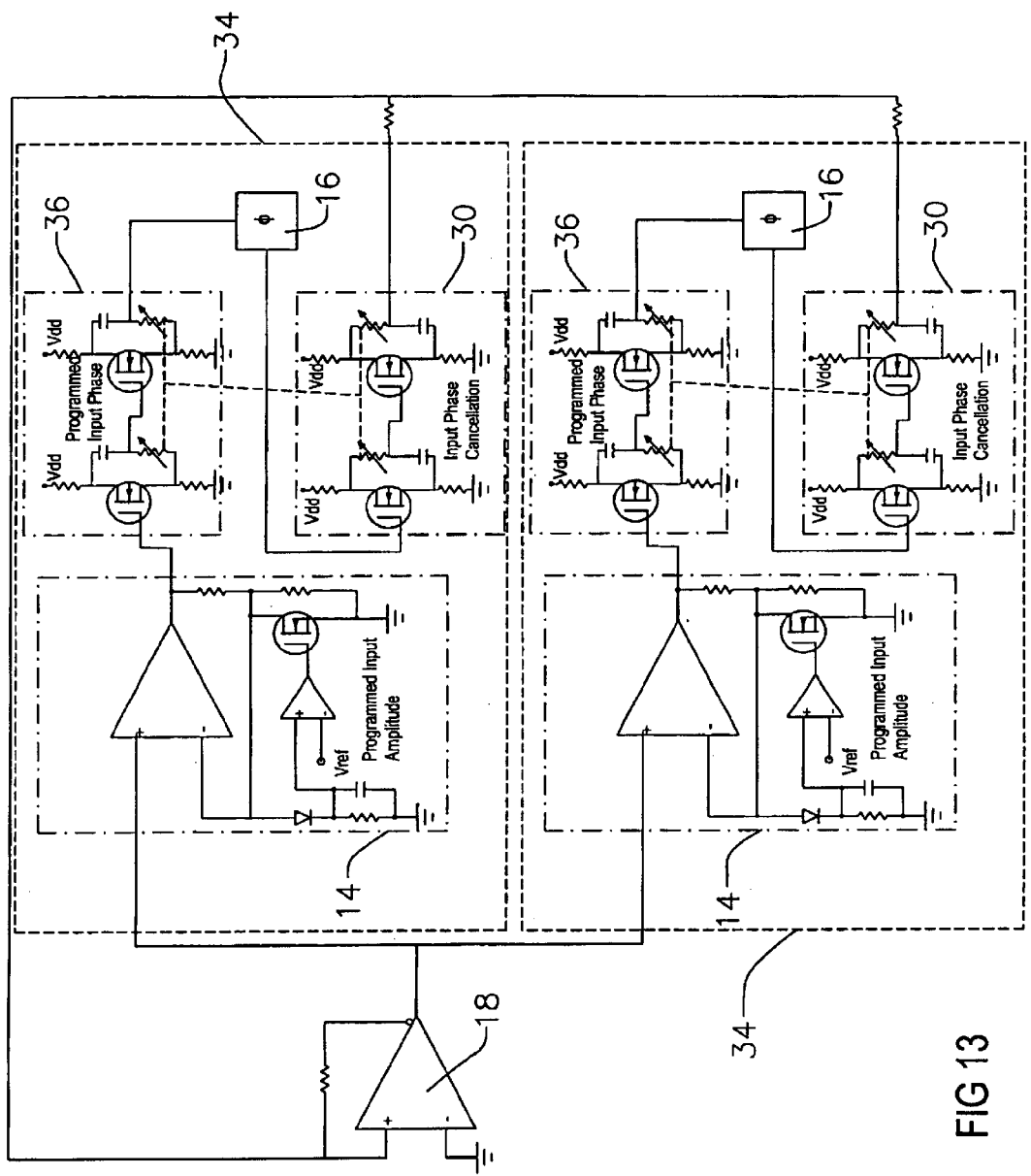
FIG. 13 shows a detail of FIG. 9 using elements of FIG. 12.

The phase-shift oscillator implementation reflected by FIGS. 6, 7 and 12 represents a single term in the sums shown in Equation 1. Since there are N terms in these sums, N such circuits are required to implement the invention. In order to achieve the proper result from the intended computation, these N oscillator circuits must maintain a known, fixed phase relationship, preferably all circuits being in phase. Thus, with reference to FIG. 13, an in-phase relationship among the oscillators can be guaranteed by using the combined, parallel phase-shift circuits as the phase-shift element in a common phase-shift oscillator. The oscillator amplifier 18 uses the mean amplitude of its legs 34 to avoid clipping. Each leg is separately programmable in its complex amplitude (i.e., amplitude and phase). In the device of the invention, this configuration would be repeated with each of N separate legs. The phase-shifted signals from each leg would be extracted from the appropriate $\phi$ tap-point location and fed to a summing amplifier to reproduce the summation of Equation 1.

The concept of applying the desired $2\pi$ phase shift of the combined fractional network as the phase delay of a phase-shift oscillator may be extended in a manner that provides increased accuracy of the device. Since the inverse transform of a transform results in the original signal, the circuitry could be arranged to use a coupled transform/inverse transform construction as the feedback signal to a set of oscillation amplifiers. This sort of arrangement would help to dampen out the effects of component variations and essentially "lock in" a solution guaranteed to be a transform/inverse transform pair.

Figure 14:
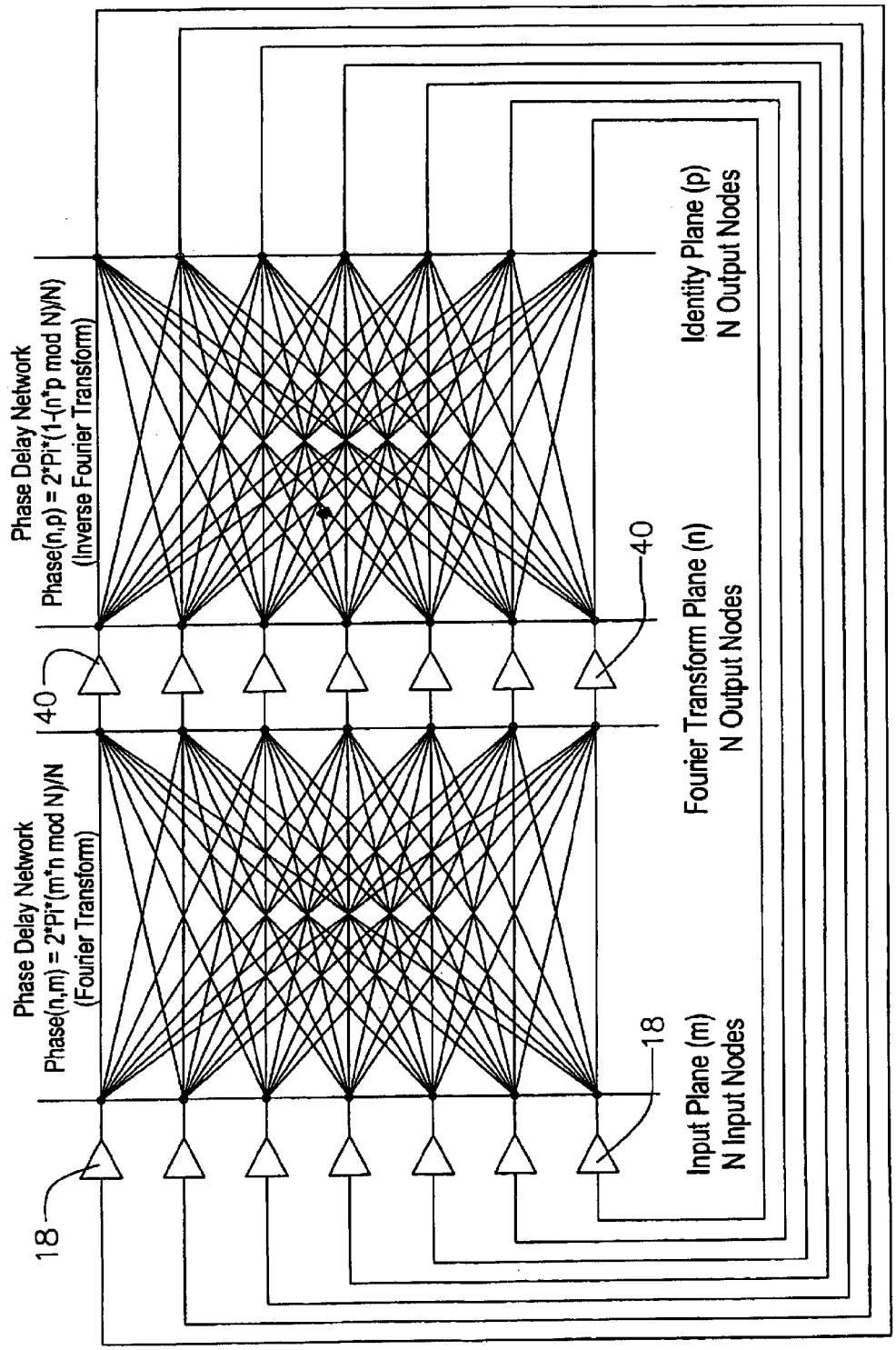
FIG. 14 is a schematic illustration of an identity transform oscillator configuration wherein the output signals of the identity transform are fed back to the input section to ensure that only oscillation modes corresponding to the identity transform undergo amplification.

FIG. 14 provides a view of such an identity transform oscillator configuration. Schematically, the outputs of the identity transform are fed back to the input plane. Such a technique of positive feedback will result in oscillations such that only those modes corresponding to the identity transform will survive amplification. Thus, the network itself limits the mode of oscillation to that which will provide the identity transformation. Although the illustration relates to a Fourier/Inverse Fourier transform pair creating the identity transform, any transform/inverse pair may be substituted.

The circuit of FIG. 14 actually provides two oscillation amplifiers (18 and 40) for each leg of the network. As would be easily understood by one skilled in the art, the coupling of a transform with its inverse is the same as coupling an inverse with its transform; i.e., both configurations produce an identity transform. Therefore, the two sets of oscillation amplifiers 18,40 reinforce each other with the added benefit that one can use either set of amplifiers to "program" the amplitude and phase of the signals at that stage. Therefore, if the first set is programmed, the result is a transform readable at the second set. Conversely, programming the second set results in the inverse transform at the first set. Thus, the mode of operation is to program one set and allow the other set to "float" to the required answer.

Although the analysis given above relates specifically to DFTs, it should be clear to those skilled in the art that the device of the invention is not restricted to performing such calculations. Equations 1 and 2 shows that any well-behaved function can be expressed in terms of Fourier coefficients. This being the case, any set of functions that can be used to model a discrete set of data can be expressed in the circuit of the invention through selection of the appropriate phase-shift tap (or waveguide lengths) and adjustment of the termination circuits. For example, the same circuit can be used in the computation of a wavelet transform.

It is clear that Equation 19 can be rewritten as $$O_n = \sum_m^N M_{m,n} A_m \exp(i\varphi_m), \quad (24)$$

where $$M_{m,n} = \sum_p^N \frac{R_{g,n}}{R_{m,n,p}} e^{-i2\pi np/N}. \quad (25)$$

Equation 24 is the general definition of a linear transformation and, therefore, may represent any such transformation by simply setting the proper values of $R_{g,n}$ and $R_{m,n,p}$. It is also clear that Equation 25, restricted to values of $$R_{m,n,p} = \frac{K}{\delta(p - kN/2)}, \quad (26)$$

where k is an integer, will construct a real-numbered transform. For negative coefficients, odd values of k are used. Since a discrete wavelet transform is, ultimately, just a real-valued transform, one need only set the resistance values to match the wavelet matrix.

Accordingly, without loss of generality, the use of DAUB04 was investigated as the "mother" wavelet function in a 16-element space, i.e., N=16. In this space, the transformation matrix is as reported in FIG. 15. If a fixed value is chosen for $R_{g,n}=G$, then the value for the signal amplitude modification resistors 24 (see FIG. 11) is given simply by Equation 26 and the table of matrix values of FIG. 15. For table entries of zero, no resistor connection is made. For positive values, a resistance of $G/M_{m,n}$ is connected to the p=N tap point. For negative values, a resistance of $G/-M_{m,n}$ is connected to the N/2 tap point. All other tap points go unconnected. In any other N-dimensional space, the procedure for selecting resistances is identical, as follows: 1. compute the final wavelet matrix based on the desired mother function; 2. set resistances corresponding to positive matrix elements to $G/M_{m,n}$; 3. set resistances corresponding to negative matrix elements to $G/-M_{m,n}$; and 4. make no other connections to other tap points.

As would be clear to one skilled in the art, any other linear transformation can be achieved in the same manner using Equation 25 and the transformation matrix elements to determine the appropriate resistance values. Note that Equation 25 provides discrete phase values to match to the matrix elements of interest. In the event the matrix elements do not correspond to these discrete values, the signal generator array of the invention can be altered to provide more appropriate phase values either through the use of more phase-shift elements for a finer selection or through unequal phase-shift elements that provide the exact values required.

Figure 16:
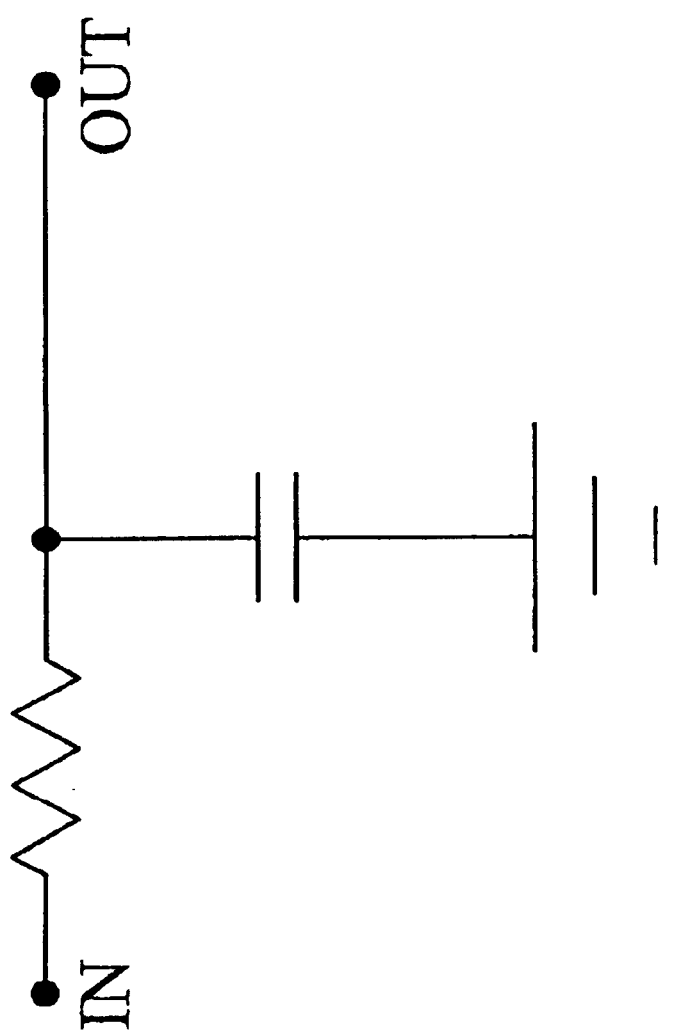
FIG. 16 is a schematic illustration of a conventional analog phase-shift circuit.

Various changes in the details, steps and components that have been described may be made by those skilled in the art within the principles and scope of the invention herein illustrated and defined in the appended claims. For example, while the serial circuit 16 of the invention has been described in terms of P preferably equal phase-shift elements 10, wherein each element produces a phase shift equal to $2\pi/P$, it is clear that the invention could be practiced equivalently by serially connecting unequal phase-shift element so long as the cumulative phase shift remains set at $2\pi$. Similarly, it is understood that analog phase-shift elements 10 are well known in the art and any kind can be used to practice the invention. A simple implementation of such an analog device is illustrated in FIG. 16.

Figure 17:
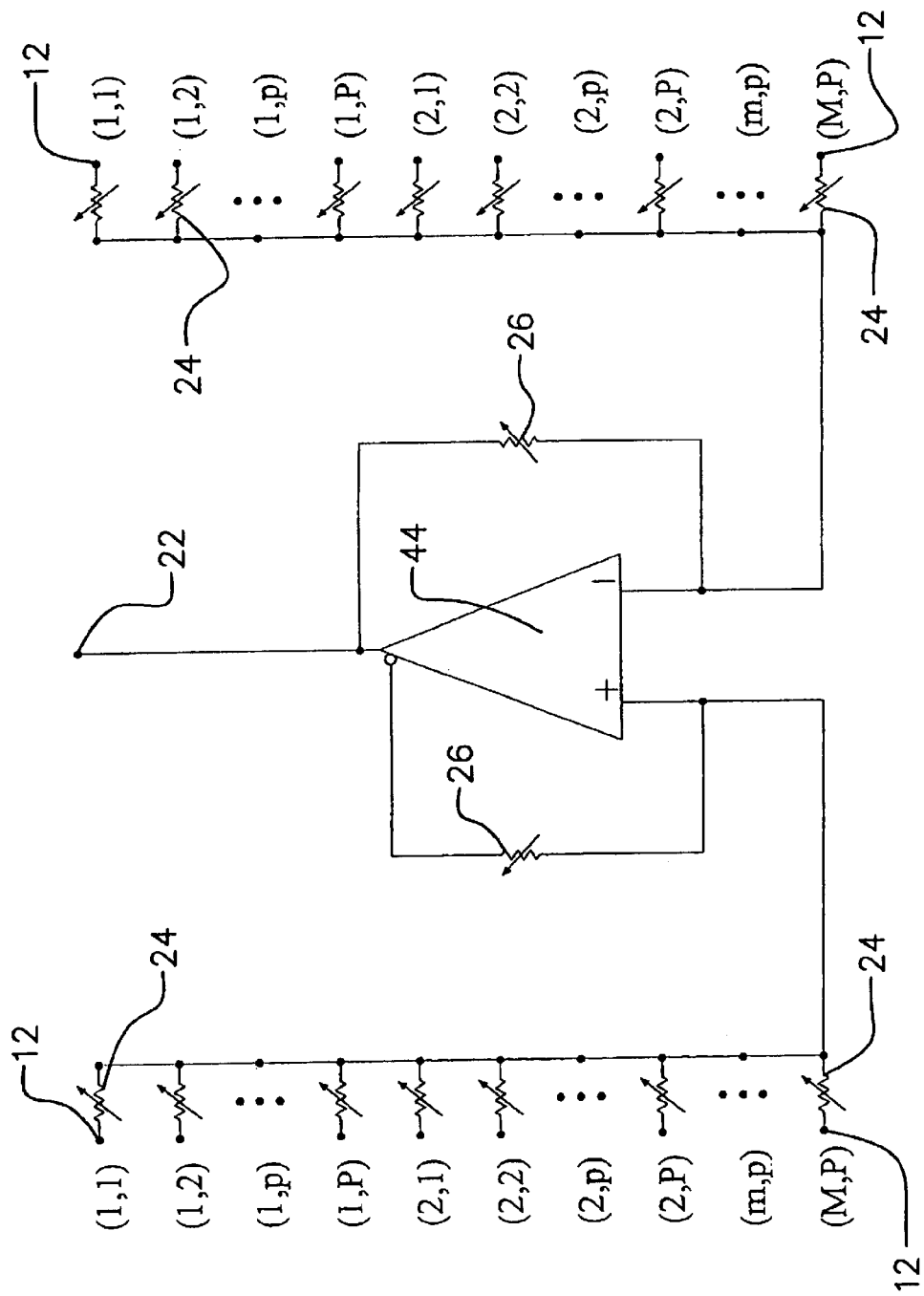
FIG. 17 is a schematic illustration of another embodiment of the invention wherein a differential amplifier is utilized to provide a n-radian phase shift in addition to the multi-element phase-delay network.

It is noted that the invention has been described in terms of a phase-shift circuit 16 that produces a total shift of $2\pi$ radians using a series of P phase-shift elements 10. However, it is known in the art that a phase shift of $\pi$ radians may be provided through the inverting input of an operational amplifier, particularly a fully differential amplifier. Therefore, with reference to FIGS. 6 and 10, it is clear that a phase shift between $\pi$ and $2\pi$ can be obtained through the use of the inverting input of the amplifier 20 and a reduced number of elements 10 in the phase-shift circuit 16. Thus, the invention could be implemented in equivalent fashion using only P/2 elements 10. Alternatively, the phase-shift resolution could be doubled using an inverting amplifier and P elements 10. FIG. 17 illustrates this concept extended to the general implementation of the invention as described above. In this configuration, the phase-delay network provides a n-radian phase shift with P tap points. Each tap point is routed to both the inverting and the non-inverting inputs of a fully differential amplifier 44.

Figure 18:
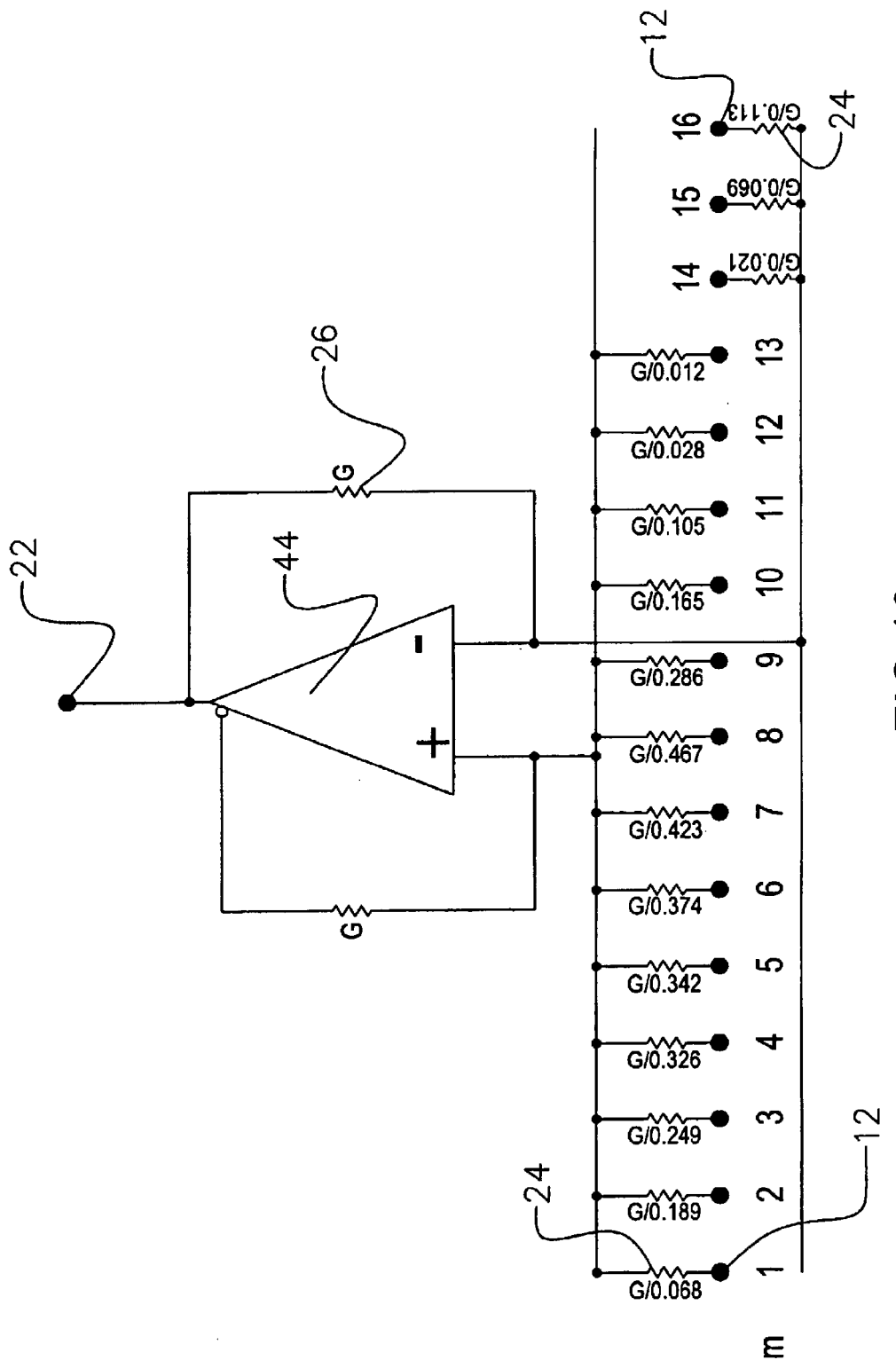
FIG. 18 is a schematic illustration of another embodiment of the invention wherein the first element of the wavelet transform of FIG. 15 is implemented using only a fully differential summing-amplifier circuit.

Finally, since real-valued transforms can be fully achieved with phase shifts of $\pi$ radians, such a transform circuit could be implemented totally with differential amplifiers. FIG. 18 exemplifies this implementation with a circuit designed to yield the first element of the wavelet transform of FIG. 15 using only differential amplifiers.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and procedures.

What is claimed is:

1. An analog device for effecting a linear transformation of input data corresponding to respective discrete values of a function, comprising:
   a plurality of input nodes for receiving analog signals representative of said input data;
   a plurality of analog phase-shift components connected to each of said plurality of input nodes for producing corresponding phase shifts in said analog signals; and
   a plurality of output nodes connected to said phase-shift components for producing analog output signals representative of output data corresponding to a linear transform of said discrete values of the function;
   wherein each of said phase-shift components includes a waveguide selected with a length suitable for producing a predetermined phase shift.

2. The device of claim 1, further including a plurality of amplitude-control elements corresponding to each of said output nodes to adjust respective outputs thereof to desired transform amplitudes.

3. The device of claim 2, wherein each of said amplitude-control elements includes a programmable resistor.

4. The device of claim 1, further comprising a computation device operating on said analog output signals to perform a predetermined operation, and an inverse-transform device to convert output data of said computation device to a set of corresponding processed values of said function.

5. The device of claim 4, wherein said inverse-transform device includes:
   a plurality of inverse-transform input nodes for receiving analog signals representative of said output data of the computation device;
   a plurality of analog inverse-transform phase-shift components connected to each of said plurality of inverse-transform input nodes for producing corresponding phase shifts in said analog signals representative of the output data of the computation device; and
   a plurality of inverse-transform output nodes connected to said inverse-transform phase-shift components for producing analog inverse-transform output signals representative of said processed values of the function.

6. The device of claim 5, further including:
   a plurality of amplitude-control elements corresponding to each of said output nodes to adjust respective outputs thereof to desired transform amplitudes; and
   a plurality of inverse-transform amplitude-control elements corresponding to each of said inverse-transform output nodes to adjust respective inverse-transform outputs thereof to desired inverse-transform amplitudes.

7. The device of claim 5, wherein each of said inverse-transform phase-shift components includes a waveguide selected with a length suitable for producing a predetermined phase shift.

8. The device of claim 5, wherein each of said inverse-transform phase-shift components includes at least one phase-shift element of a serially connected multiplicity of phase-shift elements, wherein said multiplicity of phase-shift elements produces a total phase shift equal to 2 k$\pi$ radians, k being an integer.

9. The device of claim 4, wherein said computation device performs a filtering operation.

10. The device of claim 4, wherein said computation device performs a convolution operation.

11. The device of claim 4, wherein said computation device performs a correlation operation.

12. The device of claim 4, wherein said computation device performs a linear-prediction operation.

13. The device of claim 4, wherein said computation device performs a matrix-vector-multiplication operation.

14. An analog device for effecting a linear transformation of input data corresponding to respective discrete values of a function, comprising:
   a plurality of input nodes for receiving analog signals representative of said input data;
   a plurality of analog phase-shift components connected to each of said plurality of input nodes for producing corresponding phase shifts in said analog signals; and
   a plurality of output nodes connected to said phase-shift components for producing analog output signals representative of output data corresponding to a linear transform of said discrete values of the function;
   wherein each of said phase-shift components includes at least one phase-shift element of a serially connected multiplicity of phase-shift elements, wherein said multiplicity of phase-shift elements produces a total phase shift equal to 2 k$\pi$ radians, k being an integer.

15. The device of claim 14, wherein each of said phase-shift elements produces an equal phase shift.

16. An identity transform oscillator comprising:
   a plurality of input nodes for receiving analog signals representative of input data;
   a plurality of analog phase-shift components connected to each of said plurality of input nodes for producing corresponding phase shifts in said analog signals;
   a plurality of output nodes connected to said phase-shift components for producing analog output signals representative of output data corresponding to a linear transform of said input data;
   a plurality of inverse-transform input nodes for receiving said analog output signals;
   a plurality of analog inverse-transform phase-shift components connected to each of said plurality of inverse-transform input nodes for producing corresponding phase shifts in said analog output signals;
   a plurality of inverse-transform output nodes connected to said inverse-transform phase-shift components for producing analog inverse-transform output signals; and
   a feedback loop connecting each of said inverse-transform output nodes to a corresponding input node.

17. The device of claim 16, further comprising:
   a plurality of amplitude-control elements corresponding to said phase-shift components to adjust respective outputs thereof to desired transform amplitudes; and
   a plurality of inverse-transform amplitude-control elements corresponding to said inverse-transform phase-shift components to adjust respective inverse-transform outputs thereof to desired inverse-transform amplitudes.

18. The device of claim 16, wherein each of said phase-shift components includes a waveguide selected with a length suitable for producing a predetermined phase shift.

19. The device of claim 16, wherein each of said phase-shift components includes at least one phase-shift element of a serially connected multiplicity of phase-shift elements, wherein said multiplicity of phase-shift elements produces a total phase shift equal to 2 k$\pi$ radians, k being an integer.

20. The device of claim 16, wherein each of said inverse-transform phase-shift components includes a waveguide selected with a length suitable for producing a predetermined phase shift.

21. The device of claim 16, wherein each of said inverse-transform phase-shift components includes at least one phase-shift element of a serially connected multiplicity of phase-shift elements, wherein said multiplicity of phase-shift elements produces a total phase shift equal to 2 k$\pi$ radians, k being an integer.

22. A method for effecting a linear transformation of input data corresponding to respective discrete values of a function, comprising the steps of:
   feeding analog signals representative of said input data to a plurality of input nodes;
   phase shifting said analog signals using a plurality of analog phase-shift components connected to said plurality of input nodes so as to produce phase-shifted analog signals; and
   producing analog output signals representative of output data corresponding to a linear transform of said discrete values of the function at a plurality of output nodes connected to said phase-shift components;
   wherein said phase-shifting step is carried out using phase-shift components that include a waveguide selected with a length suitable for producing a predetermined phase shift.

23. The method of claim 22, further comprising the step of:
   adjusting an amplitude of each of said phase-shifted analog signals using a plurality of amplitude-control elements.

24. The method of claim 23, wherein said amplitude adjusting step is carried out using a programmable resistor in each of said amplitude-control elements.

25. The method of claim 22, further including the steps of performing an operation on said analog output signals, and of inverse transforming processed output data of said operation.

26. The method of claim 25, wherein said step of inverse transforming said processed output data of the operation is carried out by:
   phase shifting said processed output data using a plurality of analog inverse-transform phase-shift components to produce inverse-transform phase-shifted analog signals; and
   utilizing said inverse-transform phase-shifted analog signals after amplitude adjustment to produce analog inverse-transform output signals.

27. The method of claim 26, further comprising the step of:
   adjusting an amplitude of each of said phase-shifted analog signals using a plurality of amplitude-control elements; and
   adjusting an amplitude of each of said inverse-transform phase-shifted analog signals using a plurality of inverse-transform amplitude-control elements.

28. A method for effecting a linear transformation of input data corresponding to respective discrete values of a function, comprising the steps of:
   feeding analog signals representative of said input data to a plurality of input nodes;
   phase shifting said analog signals using a plurality of analog phase-shift components connected to said plurality of input nodes so as to produce phase-shifted analog signals; and
   producing analog output signals representative of output data corresponding to a linear transform of said discrete values of the function at a plurality of output nodes connected to said phase-shift components;
   wherein said phase-shifting step is carried out using phase-shift components that include at least one phase-shift element of a serially connected multiplicity of phase-shift elements, wherein said multiplicity of phase-shift elements produces a total phase shift equal to 2 k$\pi$ radians, k being an integer.

29. The method of claim 28, wherein each of said phase-shift elements produces an equal phase shift.

* * * * *